Figure 1:
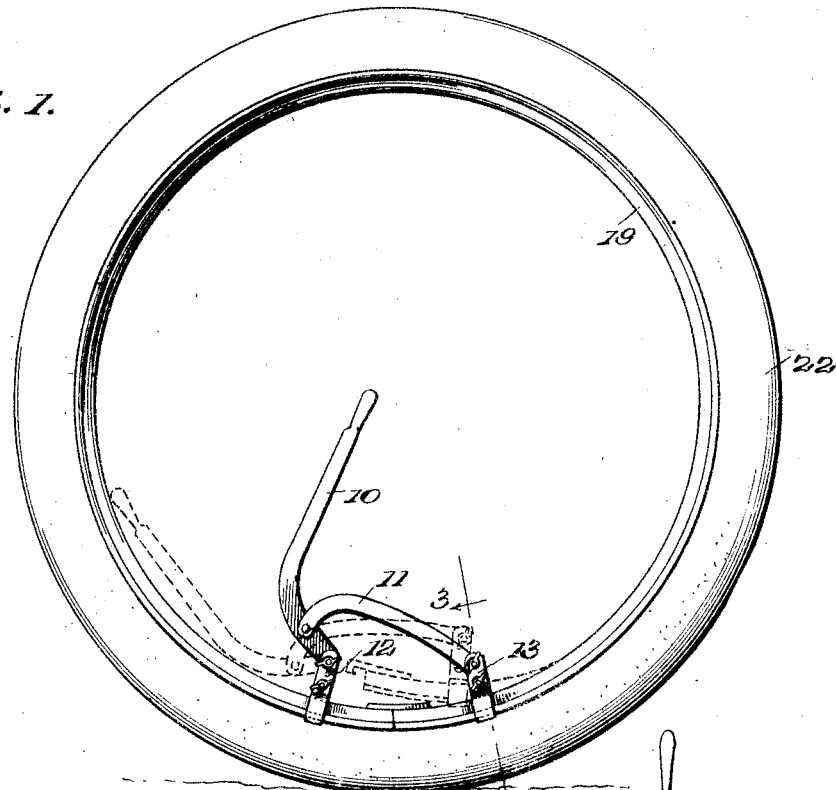

C. C. HEITMILLER.
RIM CONTRACTOR.
APPLICATION FILED SEPT. 5, 1919.

1,344,889.

Patented June 29, 1920.

Inventor
Charles C. Heitmiller
by Lacey & Lacey,
his Atty's.

UNITED STATES PATENT OFFICE.

CHARLES C. HEITMILLER, OF SEATTLE, WASHINGTON.

RIM-CONTRACTOR.

1,344,889. Specification of Letters Patent. Patented June 29, 1920.

Application filed September 5, 1919. Serial No. 321,816.

*To all whom it may concern:*

Be it known that I, CHARLES C. HEITMILLER, citizen of the United States, residing at Seattle, in the county of King and State of Washington, have invented certain new and useful Improvements in Rim-Contractors, of which the following is a specification.

This invention relates to an improved contractor for the demountable rims of motor vehicle wheels and has as one of its principal objects to provide a device of this character which may be readily applied to a rim and operated for contracting the rim, the device being adapted to automatically lock for holding the rim so contracted.

A further object of the invention is to provide a device which may, after a tire has been applied to the rim, also be employed for expanding the rim to its normal position for securing the tire thereon.

A still further object of the invention is to provide a device wherein slipping of the rim clamps employed will be prevented.

And the invention has as a still further object to provide a device which may be used upon substantially any conventional type of split demountable rim without the necessity for structural change therein.

Other and incidental objects will appear hereinafter.

Figure 2:
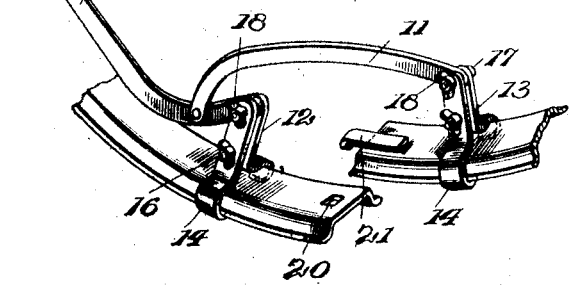
Figure 3:
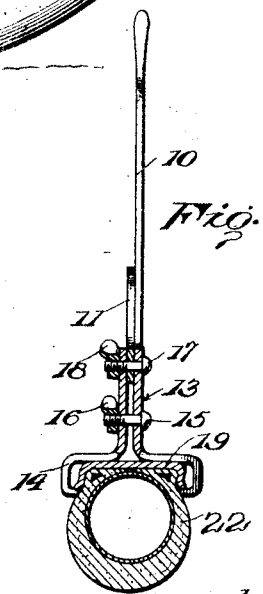

In the drawings:

Figure 1 is a side elevation showing my improved device applied to a conventional type of split demountable rim, an ordinary tire being shown upon the rim, Fig. 2 is a detail perspective view also showing the device applied, the end portions of the rim being broken away, and Fig. 3 is a transverse sectional view taken on the line 3—3 of Fig. 1.

In carrying the invention into effect, I employ an operating lever 10, which, at its inner end portion, is curved laterally and pivotally connected to the laterally curved inner end portion of this lever is a longitudinally curved arm or link 11. At its inner end portion this arm is directed laterally at an angle and is secured to the curved inner end portion of the lever 10 by a rivet or other suitable fastening device. At its inner end, the lever 10 carries a rim engaging clamp 12 while at its free end the arm 11 carries a companion clamp 13. These clamps are each formed of coacting jaws 14 bent at their outer end portions to engage, as shown in Fig. 3, around the sides of a rim and provided with relatively long shanks. Adjustably connecting the inner ends of the shanks of each clamp is a clamping bolt 15 preferably equipped with a wing nut 16 and adjustably connecting the outer or upper ends of the shanks of the respective clamps are pivot bolts 17 also preferably equipped with wing nuts 18. As will be noted, the pivot bolt of the clamp 12 serves to pivotally connect the clamp with the inner end of the lever 10, the lever being received between the shanks of its clamp and receiving the bolt therethrough. Likewise, the pivot bolt of the clamp 13 serves to connect this clamp with the free end of the arm 11, this arm, like the lever 10, being received between the shanks of its clamp and receiving the pivot bolt therethrough. The clamps are thus mounted to freely swing upon the lever and arm and, as will be readily appreciated, the wing nuts 16 and 18 may be readily adjusted for positioning the jaws of each clamp with respect to each other.

In the drawings, I have shown my improved rim contractor in connection with a conventional type of split demountable rim 19 provided, as is common, in one end portion with an opening 20 adapted to receive a catch 21 upon the opposite end of the rim for connecting the rim ends. Upon the rim is shown an ordinary tire 22. In applying the device, the lever 10 is first swung to the position shown in Fig. 1 for spreading the clamps 12 and 13 when these clamps are, in the manner shown in Fig. 2, engaged with the end portions of the rim, the wing nuts 16 and 18 of the bolts 15 and 17 being adjusted, of course, for firmly binding the jaws of the clamps in engagement with the rim. The lever 10 is then swung downwardly and, as will be seen, downward movement of this lever will cause the clamp 12 to be depressed for flexing the adjacent end portion of the rim outwardly while the clamp 13 will be correspondingly lifted for flexing the other end portion of the rim inwardly. The rim ends will thus be automatically shifted out of register for disengaging the catch 21 of the rim from within the opening 20. Continued downward movement of the lever 10 will then serve, as shown in dotted lines in Fig. 1, to shift the end portions of the rim into overlapping relation and contract the rim. When the lever reaches the limit of its downward movement it will also be noted, as further shown in dotted lines in Fig. 1, that the pivot point between the arm 11 and lever 10 will be moved beyond the pivotal center of the lever. Consequently, the lever upon reaching the end of its downward throw, will be automatically locked against upward movement for thus holding the rim contracted. Thus, the tire 22 may readily be displaced from the rim and as easily again fitted thereon. After the tire has been so replaced it will also be seen that by swinging the lever 10 upwardly, the device will act to expand the rim and again shift the rim ends into register, with the catch 21 connecting the rim ends.

Attention is now directed to the fact that no structural change whatever is required in the rim in order that my improved contractor may be applied thereto. Therefore, since the jaws of the clamps of the device are adjustable with respect to each other and are thus adapted to accommodate rims of different widths, the device may be employed in connection with substantially any conventional type of split demountable rim. Also, it is to be noted that the jaws of the clamps will engage the rim in such manner that mutilation of the rim will not result. However, in this connection particular attention is directed to the fact that when the jaws are applied and the lever 10 is swung downwardly, downward movement of this lever will act to cant the clamps upon the end portions of the rim. This canting of the clamps is, of course, enhanced by providing the jaws of the clamps with relatively long shanks. The clamp jaws will thus be caused to impinge against the end portions of the rim and firmly bind thereagainst so that slipping of the clamps along the rim ends will be overcome. As will be appreciated, I accordingly provide a highly effective device for the purpose set forth.

Having thus described the invention, what is claimed as new is:

In a rim contracting device, the combination with rim clamps having adjustable rim engaging jaws, of a lever having its forward portion curved longitudinally and pivoted to one of said clamps, and a link having one end portion pivoted to one of said clamps and the other end portion curved longitudinally and pivoted to the curved portion of said lever, the curved portion of said link being adapted to overhang one of said clamps when the lever is moved to an operative position at one side of the clamps.

In testimony whereof I affix my signature

CHARLES C. HEITMILLER. [L. S.]